UNITED STATES PATENT OFFICE.

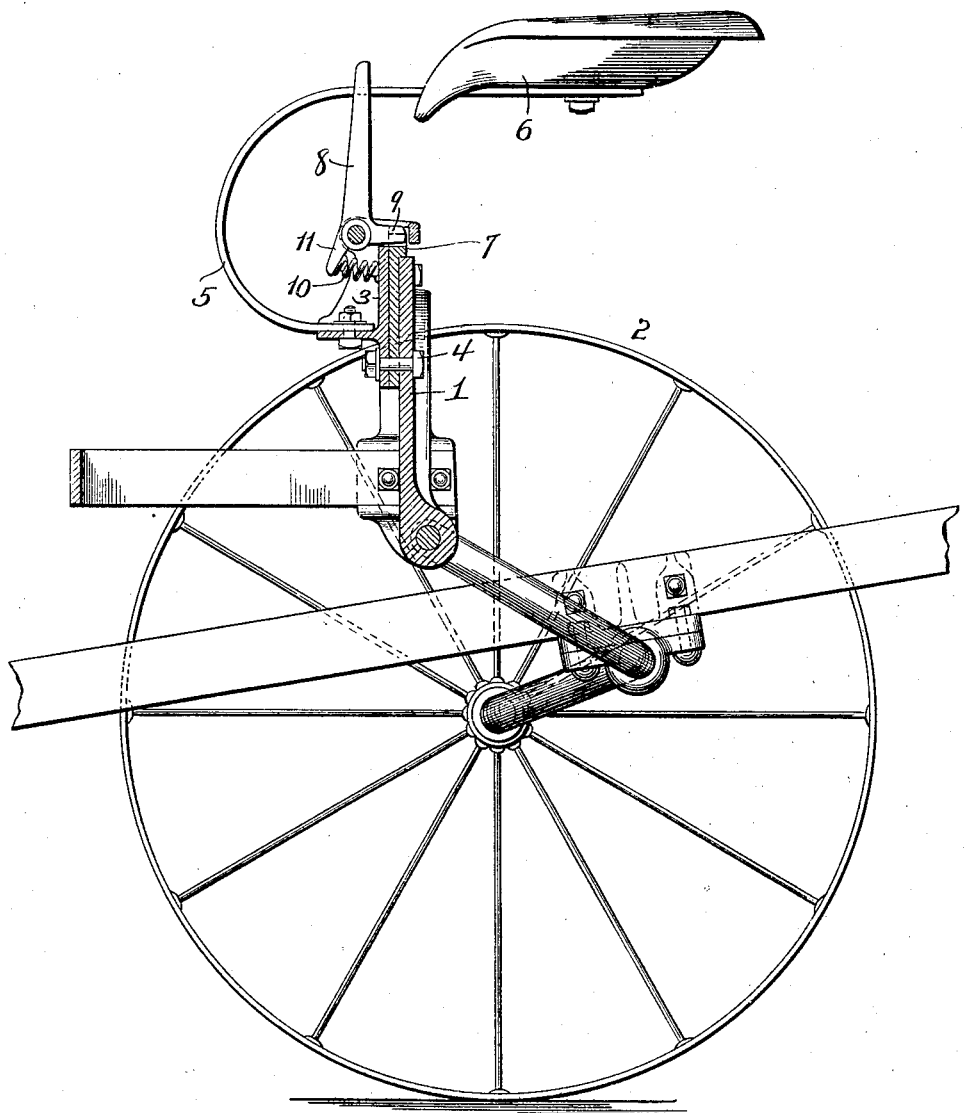

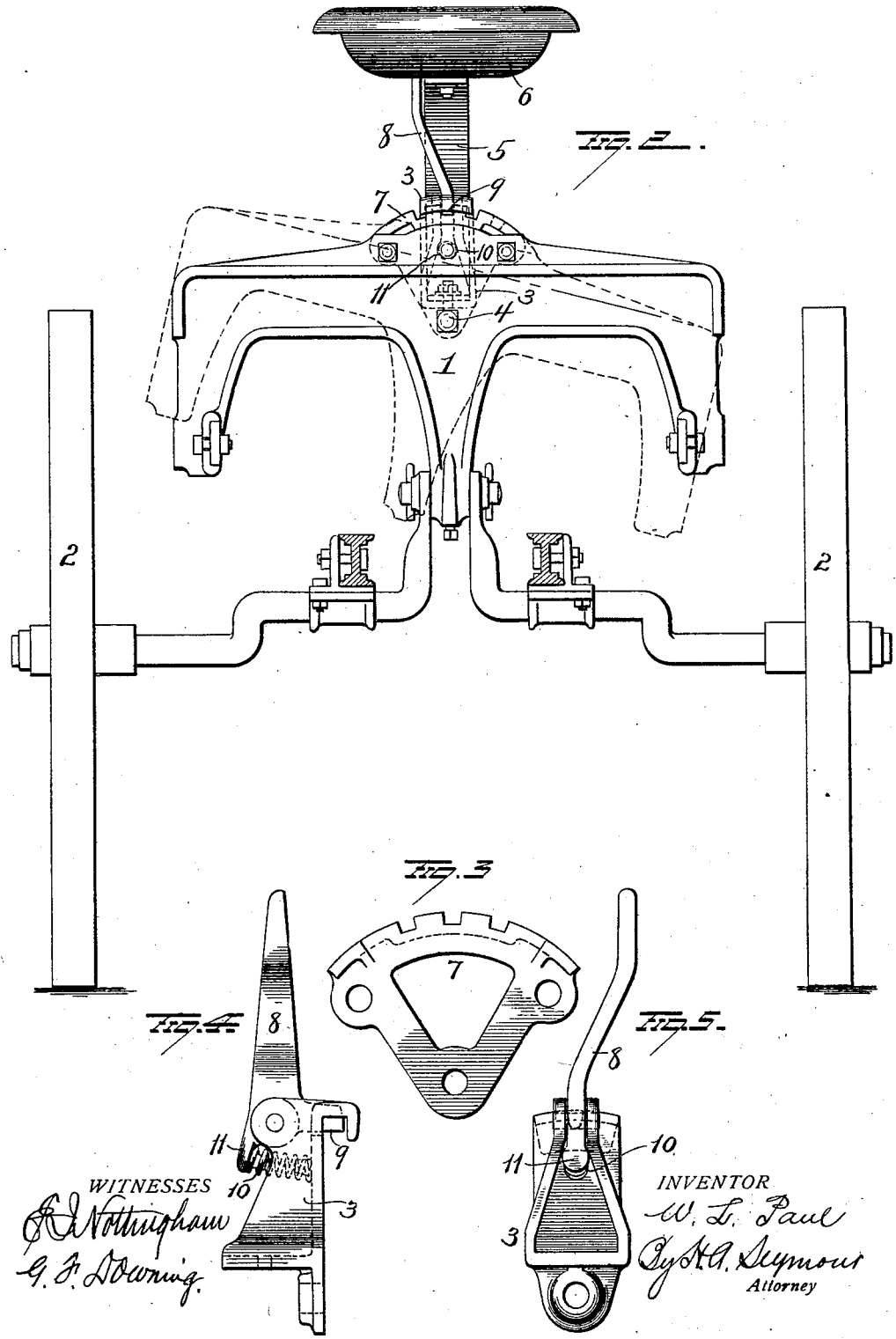

WILLIAM L. PAUL, OF SOUTH BEND, INDIANA, ASSIGNOR TO OLIVER CHILLED PLOW WORKS, OF SOUTH BEND, INDIANA.

PLOW, CULTIVATOR, AND THE LIKE.

968,398.   Specification of Letters Patent.   Patented Aug. 23, 1910.

Application filed March 16, 1909. Serial No. 483,822.

*To all whom it may concern:*

Be it known that I, WILLIAM L. PAUL, of South Bend, in the county of St. Joseph and State of Indiana, have invented certain new and useful Improvements in Plows, Cultivators, and the Like; and I do hereby declare the following to be a full, clear, and exact description of the invention, such as will enable others skilled in the art to which it appertains to make and use the same.

This invention relates to improvements in plows, cultivators and the like and more particularly to an improved seat construction,—the object of the invention being to provide simple devices whereby the operator's seat on a sulky plow, cultivator or the like can be readily adjusted or tilted during plowing on a hill-side when the machine naturally leans down hill, so as to keep the operator and his seat in proper position without disturbing the equilibrium of the machine and without discomfort to the operator.

With this object in view the invention consists in certain novel features of construction and combinations of parts as hereinafter more fully described and pointed out in the claims.

In the accompanying drawings, Figure 1 is a view showing the application of my invention. Fig. 2 is a sectional view of the structure shown in Fig. 1, and Figs. 3, 4 and 5 are enlarged detail views.

1 represents the frame of a sulky plow, cultivator or the like and 2 the wheels on which the frame is mounted.

A bracket 3 is pivotally supported at 4 by the upper portion of the frame 1 and to this bracket, (preferably slightly above the pivotal support thereof) the lower end of the spring standard 5 for the seat 6 is secured. The upper end of the pivoted bracket 3 overhangs a toothed segment 7 secured to or made integral with the frame 1. A lever 8 is pivotally supported at the upper end of the pivoted bracket 3 and carries a latch pin 9 to engage the toothed segment 7. The latch pin 9 is maintained normally in engagement with the segment 7 by means of a spring 10 bearing at one end against the bracket 3 and at the other end against a toe 11 depending from the lever 8.

It is apparent that when the latch pin 9 is disengaged from the segment 7 by the operation of the lever 8, the bracket can be swung laterally and the operator's seat correspondingly adjusted or tilted laterally a sufficient distance to cause it to maintain a horizontal position when the machine is tilted, as when plowing or cultivating on a hill-side. The operator's seat can, by means of the devices above described, be locked at any described adjustment that may be necessary to maintain proper equilibrium and to afford comfort to the operator when the machine is being worked on a hill-side.

Slight changes might be made in the details of construction of my invention without departing from the spirit thereof or limiting its scope, and hence I do not desire to restrict myself to the precise details herein set forth.

Having fully described my invention what I claim as new and desire to secure by Letters-Patent, is,—

1. The combination with a wheeled frame and a notched segment on the top thereof, of an upright bracket pivoted to the frame, a standard secured to said bracket, a seat secured to said standard, and a lever pivoted to the upper portion of the bracket and projecting upwardly above the bracket, said lever having a part projecting over the notched segment and adapted to engage the same.

2. The combination with a wheeled frame and a notched segment thereof, of a bracket pivotally attached to said frame, a spring standard secured at one end to said bracket, a seat secured to the free end of said spring standard and provided with a latch pin to engage the notched segment, a toe depending from said lever, and a spring between said toe and bracket.

3. The combination with a wheeled frame and a notched segment thereon, of a bracket pivoted to said frame and provided at its upper edge with a lip embracing the notched edge of the segment, a standard secured to said bracket, a seat on said standard, and a lever pivoted to the bracket and provided with a part to engage the notched segment.

In testimony whereof, I have signed this specification in the presence of two subscribing witnesses.

WILLIAM L. PAUL.

Witnesses:
D. A. HINES,
W. A. WEED.